United States Patent [19]
Henck

[11] Patent Number: 5,604,625
[45] Date of Patent: Feb. 18, 1997

[54] MICROMECHANICAL DEVICE MANUFACTURED OUT OF INCOMPATIBLE MATERIALS

[75] Inventor: Steven A. Henck, Plano, Tex.

[73] Assignee: Texas Instruments Incorporated, Dallas, Tex.

[21] Appl. No.: 473,596

[22] Filed: Jun. 7, 1995

Related U.S. Application Data

[62] Division of Ser. No. 220,429, Mar. 30, 1994.

[51] Int. Cl.$^6$ .................................................. G02B 26/08
[52] U.S. Cl. ........................ 359/224; 359/230; 359/298; 216/24
[58] Field of Search ..................................... 359/227, 230, 359/223, 224, 847, 298; 348/770–771; 427/319, 328, 294–295, 166; 156/654–656, 664–666

[56] References Cited

U.S. PATENT DOCUMENTS 5,061,049  10/1991  Hornbeck ................................ 359/224
5,331,454  7/1994  Hornbeck ................................ 359/224

OTHER PUBLICATIONS

Rabinowicz, "Summer Session 2.81s Tribology", Notes from Summer School Class at MIT, Jul. 12–16, 1993.

*Primary Examiner*—James Phan
*Attorney, Agent, or Firm*—Julie L. Reed; James C. Kesterson; Richardson L. Donaldson

[57] ABSTRACT

A method of preventing adhesion of contacting surfaces of micro-mechanical devices (10). Two materials are selected that are incompatible in the sense that they have at least low solid solubility and preferably, an inability to alloy. One of these materials is used as the first contacting surface (11), and the other as the second contacting surface (17).

4 Claims, 2 Drawing Sheets

MICROMECHANICAL DEVICE MANUFACTURED OUT OF INCOMPATIBLE MATERIALS

This is a division of application Ser. No. 08/220,429, filed Mar. 30, 1994 pending.

TECHNICAL FIELD OF THE INVENTION

This invention relates to micro-mechanical devices, and more particularly, to micro-mechanical devices having contacting elements that tend to adhere.

BACKGROUND OF THE INVENTION

A recent development in the field of electro-mechanics has been the miniaturization of various mechanical devices. These "micro-mechanical" devices are manufactured using integrated circuit techniques. Typical of such devices are tiny motors, used in applications such as medicine.

Reliability has been difficult to achieve with micromechanical devices. A common reliability problem is sticking, which occurs when the device has a moving part that contacts another surface of the device. The moving element may become stuck against that surface, causing the device to cease to operate properly.

The cause of the sticking is often attributed to an attractive inter-molecular force commonly referred to as the Van der Waals force. This force is related to surface energy, and increases as the surface energy increases. Existing approaches to avoiding sticking have been directed to avoiding or overcoming this force, especially by using lubricative coatings.

SUMMARY OF THE INVENTION

One aspect of the invention is a method of preventing sticking of contacting elements of a micro-mechanical device, such as a digital micro-mirror device (DMD). Two materials are selected, whose chemical properties are such that they are incompatible. Incompatibility is evidenced by low mutual solubility or the inability to form intermetallic compounds. In other words, two materials are selected that are incompatible in the sense that they have at least low solid solubility, and preferably, an inability to alloy. During manufacture, one of these materials is used for one contacting surface, and the other is used for the other contacting surface.

A technical advantage of the invention is that it does not rely on lubrication. It is directed to the properties of materials that cause adhesion to be avoided. Sticking is prevented regardless of the temperature during operation of the device.

DETAILED DESCRIPTION OF THE INVENTION

For purposes of example, the following description is in terms of a particular type of micro-mechanical device, a digital micro-mirror device (DMD). In this type of device, tiny mirrors tilt to reflect light to an image plane. An array of these mirrors is used to form an image. In the case of a DMD, the method of the invention prevents sticking of the mirrors to a "landing pad" which they touch when tilted. Other applications of DMD's are also possible that do not involve image formation, such as beam steering and switching and accelerometers. In some of these applications, the "mirror" need not be reflective and is sometimes referred to as a moveable "beam". Also, in some applications, the DMD may not necessarily be operated in a digital mode. In general, the invention could be used with any type of micro-mechanical device having some component that moves against another surface to which it might become stuck.

Figure 1:
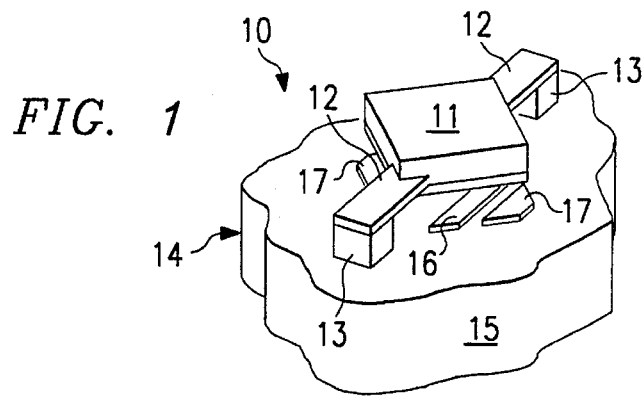
FIG. 1 illustrates an undeflected mirror element of one type of micro-mechanical device, a digital micro-mirror device (DMD), having contacting surfaces made from incompatible materials in accordance with the invention.
Figure 2:
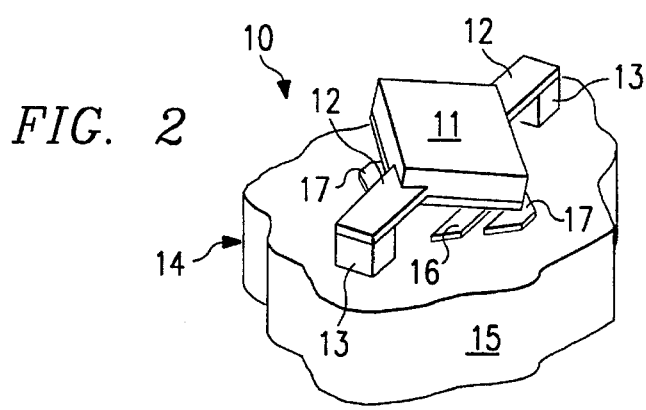
FIG. 2 illustrates the mirror element of FIG. 1 in a deflected position.

FIGS. 1 and 2 illustrate a single mirror element 10 of a DMD. In FIG. 1, the mirror element 10 is in a flat (undeflected) state, whereas in FIG. 2, the mirror element 10 is deflected. A typical DMD has an array of hundreds or thousands of such mirror elements 10.

In operation for display applications, a light source illuminates the surface of the DMD with visible white light. A condenser lens (not shown) may be used to shape the light to approximately the size of the array of mirror elements 10 and to direct this beam to their reflective surfaces. Each mirror element 10 has a tilting mirror 11 supported by torsion hinges 12 attached to support posts 13. The mirrors 11 are positioned over an address/memory circuit 14, which is fabricated on a silicon substrate 15. Electrostatic forces based on the data in the memory cells of address/memory circuit 14 tilt each mirror 11 either +10 degrees (on) or −10 degrees (off), thereby modulating the light incident on the surface of the DMD. Light reflected from the on mirrors 11 is directed to a viewer, via various display optics (not shown), to create images. Light from the off mirrors is reflected away from the viewer. The proportion of time during each image frame that a mirror 11 remains in the on position determines shades of grey. Color can be added by means of a color wheel or by a three-DMD setup (not shown).

Address/memory circuit 14 has a memory cell associated with each mirror element 10, as well as two address electrodes 16 and two landing electrodes 17. The mirror 11 has three states. It operates in a bistable mode, tilting 10 degrees about the hinges 11 in one or the other direction. The third state is a flat position to which the mirrors 11 return when the display is not in operation.

In effect, the mirror 11 and the address electrodes 16 form capacitors. When +5 volts (digital 1) is applied to one address electrode 16, 0 volts (digital 0) is applied to the other address electrode 16, and a negative bias to the mirror 11, the electrostatic charge thus created causes mirror 11 to tilt toward the +5 volt electrode 16. The voltage on the address electrode 16 starts the mirror 11 tilting, whereupon it continues under its own momentum until it hits the landing electrode 17.

Once a mirror 11 tilts in either direction, it remains electro-mechanically latched in that state. Merely changing the states of the address electrodes 16 will not cause the mirror to move; it is removal of the bias on each mirror 11 that causes it to return to its untilted position. As explained below, sticking of the underside of mirror 11 to landing electrode 17 is avoided by the use of incompatible materials for these surfaces. When the bias is reapplied, the mirrors 11 tilt in accordance with their new address states.

Thus, one aspect of the invention is the use of incompatible materials on contacting surfaces of the DMD. The use of materials of proper incompatibility reduces adhesion of the surfaces regardless of temperature and relatively independent of lubrication. The use of lubrication is supplemental to the teachings of the invention.

In general, in the case of metals, incompatibility is indicated by the inability to alloy or very low solubility of the higher melting point metal in the lower melting point metal. At the other extreme, compatible materials have complete solid solubility. In the mid-range are materials having some solid solubility and which might or might not also form intermetallic compounds. Discussions of incompatible materials may be found in materials relating to friction between sliding surfaces. See Rabinowicz, *Friction and Wear of Materials*, pp. 30, 75 (John Wiley & Sons) 1965, and in Coffin, "A Study of the Sliding of Metals with Particular Reference to Atmosphere", *Lubrication Engineering* (Jan–Feb. 1956). One aspect of the invention is the recognition that using incompatible materials avoids sticking in the case of momentarily contacting surfaces, as distinguished from avoiding friction between surfaces that slide against each other.

Figure 3:
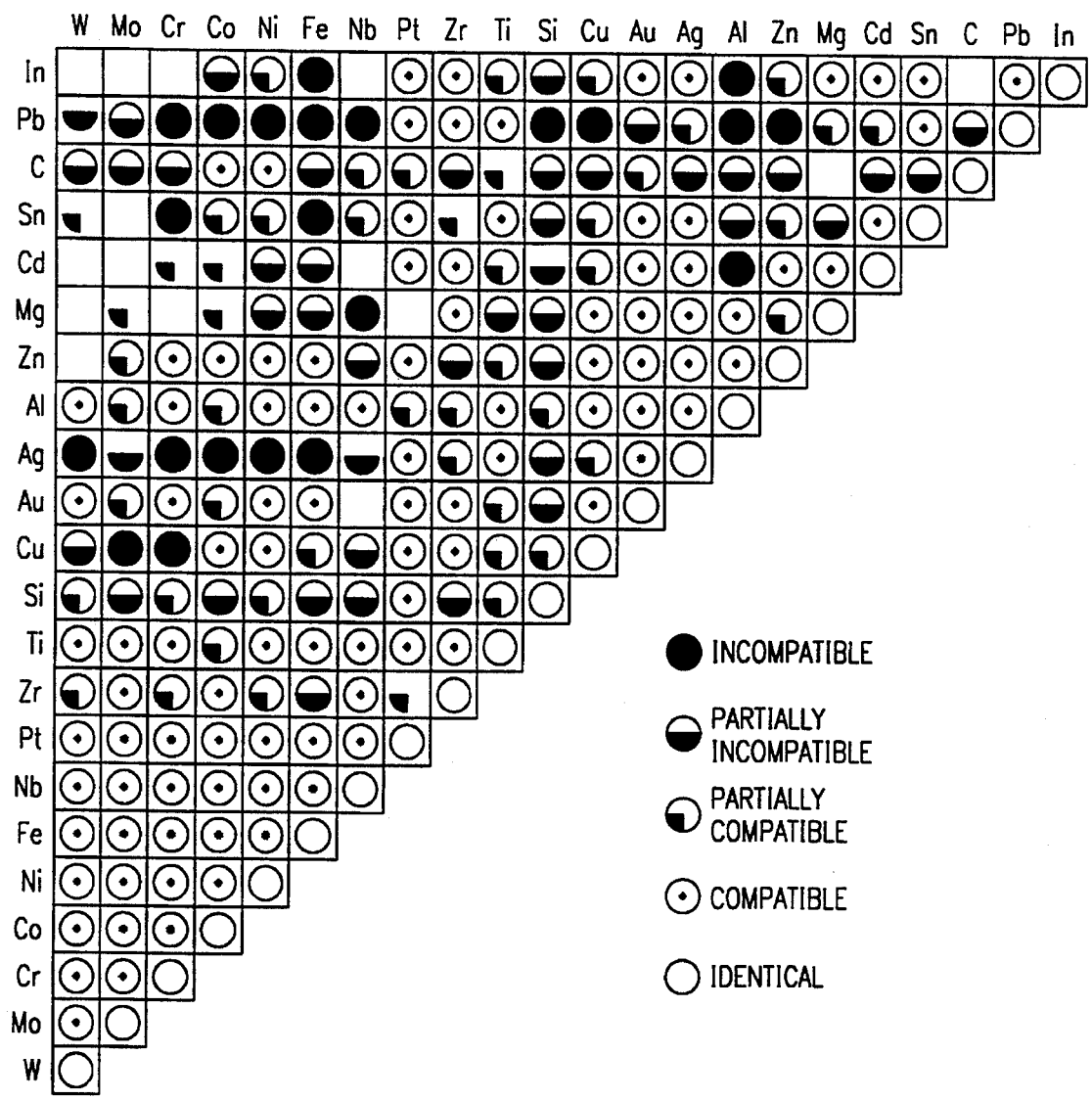
FIG. 3 is a chart useful for selecting incompatible materials in accordance with the invention.

FIG. 3 is a chart useful for selecting incompatible materials in accordance with the invention. Two materials that have low compatibility can be used for the two contacting surfaces. These materials could be used to make the contacting elements or could be deposited as a coating on the surfaces of the contacting elements. Conventional etching and deposition techniques known in the art of micro-mechanical device fabrication can be used to make the contacting elements or to coat their surfaces.

An example of two metals especially suited for the contacting surfaces of a DMD are titanium (Ti) and tantalum (Ta). These metals provide a conducting contact. They are readily incorporated into the processing schemes for manufacturing micro-mechanical devices. They are able to withstand high temperatures and do not give rise to toxicity problems.

Figure 4:
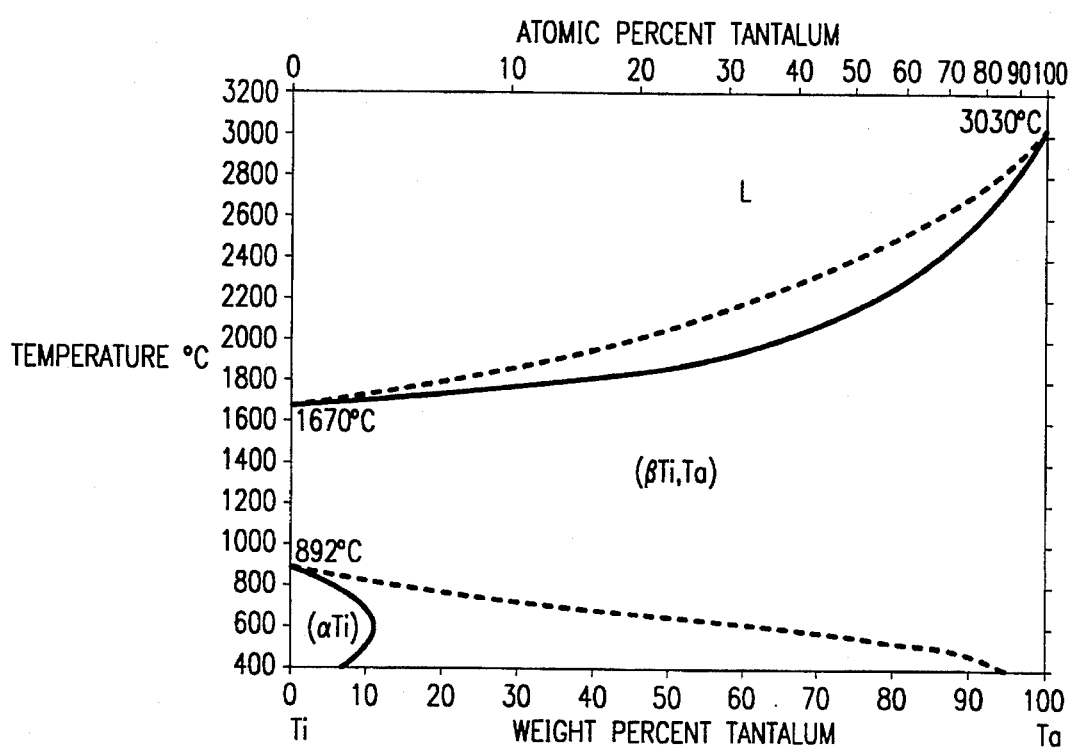
FIG. 4 illustrates how phase diagrams may be used for selecting incompatible materials in accordance with the invention.

FIG. 4 illustrates the use of phase diagrams to determine incompatibility. In the example of FIG. 4, the two materials are titanium and tantalum. At all temperatures and for all percentages of compositions, these two metals do not alloy.

The mirror element 10 of FIGS. 1 and 2 is known as a "torsion beam" mirror element. However, the invention is useful with other DMD designs. For example, in a cantilever design, a mirror is supported at one end by a hinge and its free end tilts down toward its address and landing electrodes. The contacting free end might adhere to the landing electrode. Various DMD designs, with which the invention is useful, are described in U.S. Pat. Nos. 5,083,857, 5,061,049, 4,956,619, and 4,662,746. Each of these patents is assigned to Texas Instruments Incorporated and each in incorporated by reference herein. These patents also describe various etching and deposition processes that may be used to create the contacting elements with the incompatible materials described herein or to coat the contacting surfaces with these materials. Furthermore, as stated above, the invention is useful with any micro-mechanical device having a moving part that contacts another surface.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A digital micro-mechanical device, comprising:
    an array of beam elements fabricated over a substrate, each beam element having a beam supported by a hinge that permits said beam to tilt downward toward said substrate;
    an address-memory circuit fabricated upon said substrate, said address-memory circuit having at least one address electrode and at least one landing electrode associated with each said beam element;
    wherein the spacing of each said beams from its associated landing electrode permits said beam to contact said landing electrode during operation of said micro-mechanical device; and
    wherein the underside of each said beam and the upper surface of said landing electrode are comprised of incompatible materials, said materials being titanium and tantalum.

2. The digital micro-mechanical device of claim 1, wherein at least one said materials are deposited as a coating during manufacture of said beam elements or said landing electrode.

3. The digital micro-mechanical device of claim 1, wherein each said beam is etched from one of said materials.

4. The digital micro-mechanical device of claim 1, wherein said landing electrode is etched from one of said materials.

* * * * *